(12) United States Patent  
Kondo et al.

(10) Patent No.: US 8,117,728 B2
(45) Date of Patent: Feb. 21, 2012

(54) METHOD AND DEVICE FOR INSTALLING OPEN SEAL

(75) Inventors: Toshiyuki Kondo, Tochigi (JP); Saeko Komatsu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 980 days.

(21) Appl. No.: 12/065,582

(22) PCT Filed: Nov. 24, 2005

(86) PCT No.: PCT/JP2005/022032
§ 371 (c)(1),
(2), (4) Date: Mar. 3, 2008

(87) PCT Pub. No.: WO2007/060750
PCT Pub. Date: May 31, 2007

(65) Prior Publication Data
US 2009/0165278 A1    Jul. 2, 2009

(51) Int. Cl.
*B23P 11/02* (2006.01)
*B23P 11/00* (2006.01)

(52) U.S. Cl. ........................................ 29/450; 29/243.5

(58) Field of Classification Search ............... 29/525, 29/243.5, 243.57, 243.58, 450, 235, 451, 29/821; 72/211, 210
See application file for complete search history.

(56) References Cited

U.S. PATENT DOCUMENTS 4,996,756 A * 3/1991 Bright et al. ............... 29/243.58
5,269,179 A * 12/1993 Vattakattu et al. .......... 73/116.06

FOREIGN PATENT DOCUMENTS

| JP | 5-200638 | 8/1993 |
| JP | 5-065298 B2 | 9/1993 |
| JP | 07-223566 | 8/1995 |
| JP | 8-155843 A | 6/1996 |
| JP | 8-174353 | 7/1996 |
| JP | 10-166280 | 6/1998 |
| WO | WO 01/74541 A1 | 10/2001 |

* cited by examiner

*Primary Examiner* — John C Hong
(74) *Attorney, Agent, or Firm* — Arent Fox LLP (57) ABSTRACT

A method of installing an open seal on a flange provided at a door installation opening of a vehicle, the installation being made by pressing the seal against the flange by a roller. A side face of the open seal temporarily installed on the flange is pressed by the tapered outer peripheral surface of a flange formed at one end of the roller body. Then, a back face of the open seal is pressed by the roller towards the flange. The roller is moved along the flange with constant pressing force.

2 Claims, 7 Drawing Sheets

METHOD AND DEVICE FOR INSTALLING OPEN SEAL

CROSS-REFERENCE TO RELATED APPLICATION

This application is a National Stage entry of International Application No. PCT/JP2005/022032, filed Nov. 24, 2005, the entire specification claims and drawings of which are incorporated herewith by reference.

TECHNICAL FIELD

The present invention relates to an improvement in a method and apparatus for installing a sealing member on a vehicle flange formed in a door installation opening of a vehicle body in order to seal a gap between a vehicular door and the door installation opening.

BACKGROUND ART

Conventional techniques for installing sealing members in door installation openings of vehicles include weatherstrip-installing apparatuses having automatic installation devices such as industrial robots for installing weatherstrips in door installation openings of vehicles, as disclosed in, for example, JP-B-3148496. The weatherstrip-installing apparatus disclosed in JP-B-3148496 will be discussed in relation to FIG. 7 hereof.

Figure 7:
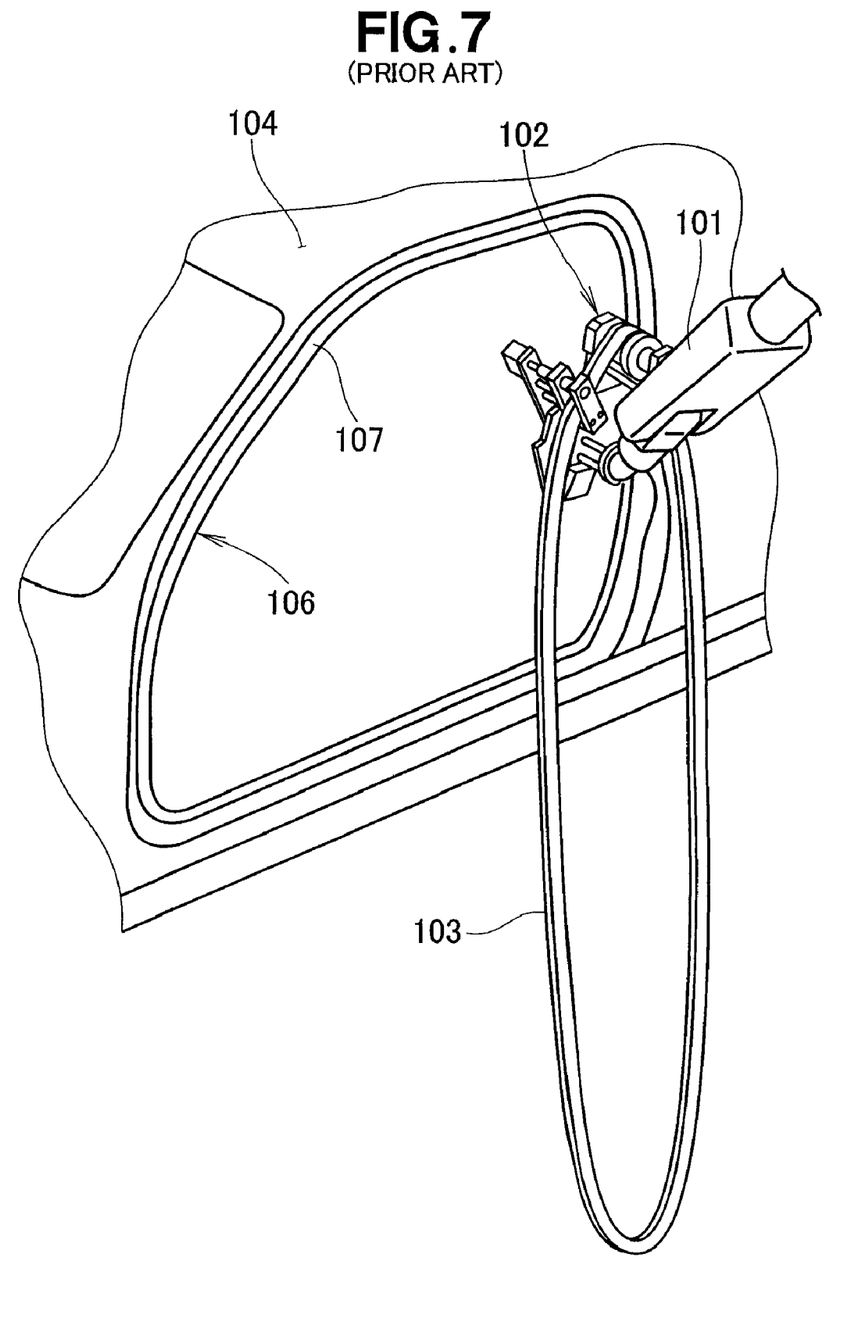
FIG. 7 is a perspective view of a conventional weatherstrip-installing apparatus.

Referring to FIG. 7, the weatherstrip-installing apparatus includes an arm 101 of an industrial robot, and a weatherstrip-installing head 102 attached to the arm 101. The weatherstrip-installing head 102 includes a roller around which a weatherstrip 103 is trained for installation on a flange 107 formed along an edge of an opening 106 of a vehicle body 104.

The roller moves along the flange 107 pressing the weatherstrip 103 onto the flange 107, thereby installing the weatherstrip 103 on the flange 107.

The robot can be designed to memorize a previously set route along which the roller moves pressing the weatherstrip 103 to install the weatherstrip 103 on the flange 107. In this case, however, while moving along the previous set route, the roller may gradually closely to or away from the flange 107 if the vehicle body 104 is displaced or manufacturing errors of the flange 107 occur. The movement of the roller gradually closely to or away from the flange 107 does not enable the roller to exert a constant pressing force on the weatherstrip 103. As a result, the weatherstrip 103 can not be uniformly installed along the flange 107.

Where the roller can not move along the flange 107 as discussed above, the route should be corrected to prevent the roller from being released from the weatherstrip 103.

There is a need to improve the sealing-member-installing technique such that the sealing member can be installed precisely uniformly along the flange, accommodating the displacement of the vehicle body or the manufacturing errors of the flange.

DISCLOSURE OF THE INVENTION

According to a first aspect of the present invention, there is provided a method for installing a sealing member on a vehicle flange with a roller pressing the sealing member against the vehicle flange, the vehicle flange being formed in a door installation opening of a vehicle, the method comprising the steps of: temporarily attaching the sealing member to the vehicle flange; pressing a roller flange against a side face of the sealing member with a first pressing force exerted on the side face, the roller flange being formed at one end of a roller body of the roller, the side face of the sealing member facing towards an outside of the vehicle; and pressing the roller body against a back face of the sealing member and towards the vehicle flange with a second pressing force exerted on the back face, wherein the roller moves along the vehicle flange while pressing the sealing member such that the first pressing force and the second pressing force are always constant.

Since the second pressing force of the roller body to press the back face of the sealing member towards the vehicle flange is always constant, the sealing member is uniformly fitted with the vehicle flange. With the sealing member thus fitted with the vehicle flange, a gap between the door installation opening and a vehicular door can be sufficiently sealed.

Further, since the first pressing force of the roller flange to press the side face of the sealing member is always constant, the roller can move precisely along the sealing member, whereby the sealing member can be satisfactorily installed on the vehicle flange, accommodating the displacement of a vehicle body or dimensional errors of the vehicle flange.

According to a second aspect of the present invention, there is provided an apparatus for installing a sealing member on a vehicle flange formed in a door installation opening of a vehicle, the apparatus comprising: a roller including a roller body and a roller flange formed at one end of the roller body for pressing a side face of the sealing member, the side face facing towards an outside of the vehicle; a moving unit for moving the roller along the vehicle flange while pressing the roller against the sealing member; a force sensor disposed between the roller and the moving unit for detecting a reaction force applied to the roller; and a control unit for controlling the moving unit on the basis of the reaction force detected by the force sensor, such that a first pressing force of the roller flange to press the side face of the sealing member and a second pressing force of the roller body to press a back face of the sealing member towards the vehicle flange are always constant as the roller is pressed against the sealing member.

The force sensor disposed between the roller and the moving unit detects the reaction force applied to the roller and generates a detection signal indicative of the reaction force. The control unit controls the moving unit on the basis of the detection signal to move the roller along the sealing member while pressing the roller against the sealing member. More specifically, in order to fit the sealing member with the vehicle flange, the moving unit is controlled such that the first pressing force of the roller flange to press the side face of the sealing member and the second pressing force of the roller body to press the back face of the sealing member towards the vehicle flange are always constant as the roller is pressed against the sealing member. The force sensor detects the reaction force in order to control both the first pressing force and the second pressing force.

Since the roller flange presses the side face of the sealing member, the roller moves along the vehicle flange without being released from the sealing member, such that the sealing member can be uniformly precisely fitted with the vehicle flange, accommodating displacement of a vehicle body and dimensional errors of the vehicle flange.

BEST MODE FOR CARRYING OUT THE INVENTION

Certain preferred embodiments of the present invention will hereinafter be described with reference to the accompanying drawings.

Figure 1:
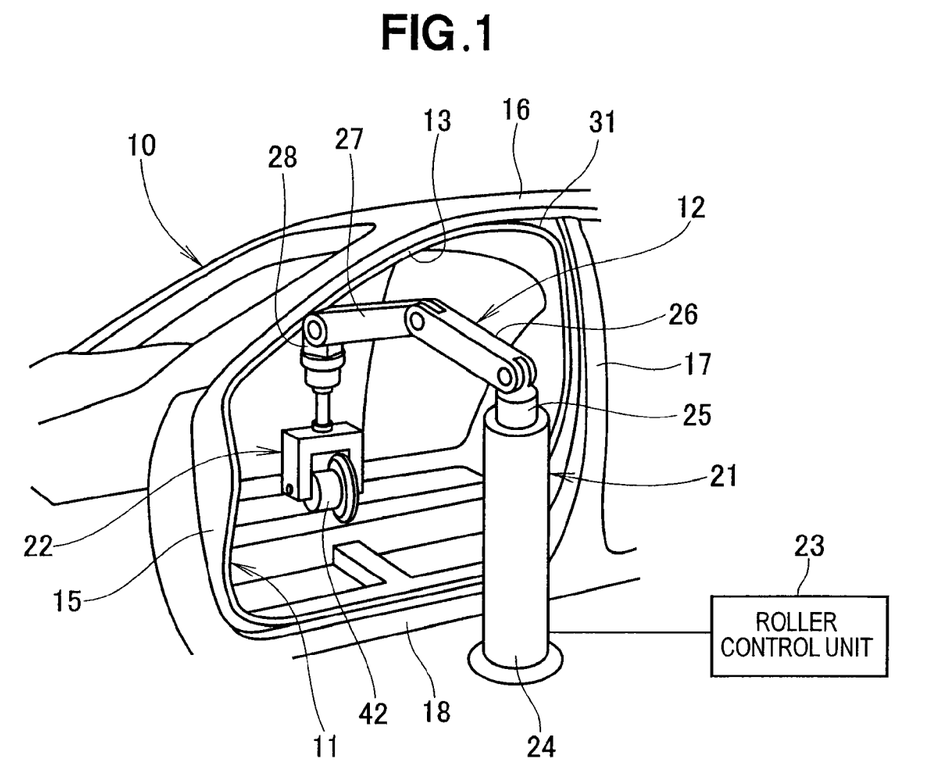
FIG. 1 is a perspective view of a vehicle body and a sealing-member-installing apparatus according to the present invention.

Referring to FIG. 1, a sealing member 13 is installed by means of a sealing-member-installing apparatus 12, on a flange (vehicle flange) 31 formed peripherally of a door installation opening 11 of a vehicle body 10. The door installation opening 11 is jointly defined by a front pillar 15, a roof side rail 16, a center pillar 17 and a side sill 18.

The apparatus 12 includes a moving unit 21, a pressing unit 22 attached to a distal end of the moving unit 21 for pressing the sealing member 13, and a roller control unit 23 for controlling both a pressing force to press a roller 42 of the pressing unit 22 against the sealing member 13 and a speed at which the roller 42 moves along the flange 31.

The moving unit 21 includes a base 24, a rotational base 25 rotatably mounted on the base 24, a first arm 26 swingably mounted on the rotational base 25, a second arm 27 swingably attached to a distal end of the first arm 26, and a supporting member 28 attached to a distal end of the second arm 27 for supporting the pressing unit 22.

Figure 2:
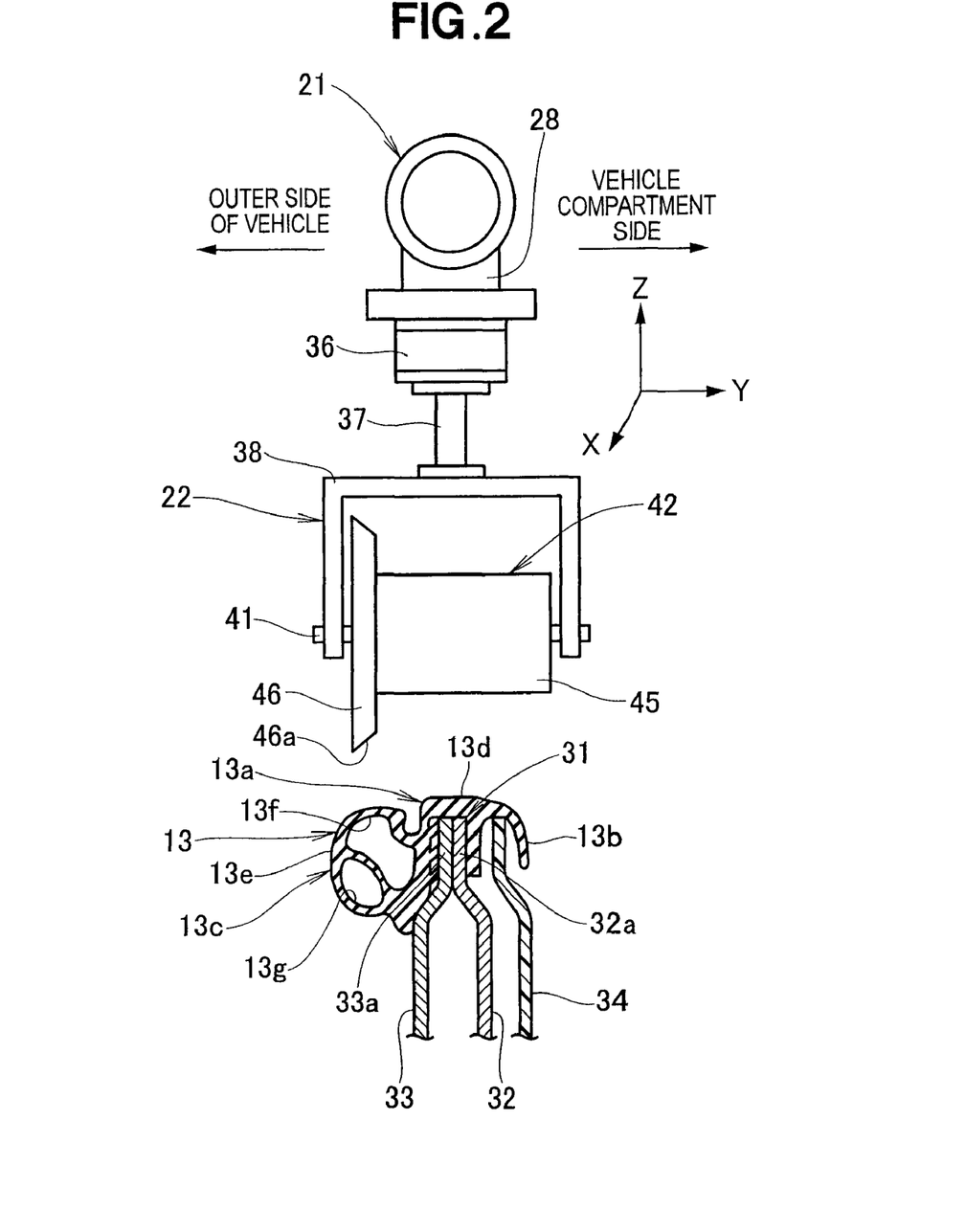
FIG. 2 is a view showing a pressing unit of the apparatus and a sealing member fitted with a vehicle flange of the vehicle body.

As shown in FIG. 2, the flange 31 on which the sealing member 13 is to be installed includes an inner panel 32 and an outer panel 33 with an edge 32 of the inner panel 32 joined to an edge 33a of the outer panel 33. A garnish 34 is disposed on a passenger-compartment-side of the inner panel 32.

The sealing member 13 is an integral molding formed from rubber. The sealing member 13 includes a U-shaped cross-sectional portion 13a fitted with the flange 31, an inner lip 13b extending from the U-shaped cross-sectional portion 13a towards the passenger-compartment-side and covering an edge of the garnish 34, and a projecting portion 13c formed on a vehicle-outside of the U-shaped cross-sectional portion 13a. The sealing member 13 seals a gap between the door installation opening 11 (FIG. 1) and a vehicle door (not shown).

The U-shaped cross-sectional portion 13a of the sealing member 13 has a back face 13d to be pressed by the roller 42. The projecting portion 13c of the sealing member 13 has a side face 13e to be pressed by the roller 42. The projecting portion 13c has a first hollow part 13f and a second hollow part 13g.

The pressing unit 22 includes a force sensor 36 attached to the supporting member 28 of the moving unit 21, a roller supporting member 38 attached through a rod 37 to the force sensor 36, and the roller 42 rotatably attached through a support shaft 41 to the roller supporting member 38.

The force sensor 36 detects axial force acting in a direction along each of an X-axis, a Y-axis and a Z-axis all of which are perpendicular to each other. The force sensor 36 also detects torque acting about each of the X-axis, the Y-axis and the Z-axis. The X-axis is directed up and down out of the sheet of FIG. 2. The Y-axis extends in an axial direction of the support shaft 41. The Z-axis extends in an axial direction of the rod 37.

The roller 42 includes a roller body 45 having its axial line on the Y-axis, and a roller flange 46 provided on one end of the roller body 45. The roller flange 46 has its outer peripheral surface 46a tapered.

In order that the roller 42 presses the sealing member 13 against the flange 31 so as to fit the sealing member 13 with the flange 31, the roller 42 moves along the flange 31 in the direction along the X-axis at a predetermined velocity. During the movement of the roller 42 along the flange 31, more specifically, the roller body 45 exerts a constant pressing force F2 to press the back face 13d of the U-shaped cross-sectional portion 13a of the sealing member 13 in the direction along the Z-axis while the roller flange 46 exerts a constant pressing force F1 to press the side face 13e of the projecting portion 13c of the sealing member 13 in the direction along the Y-axis in such a manner as to prevent the roller 42 from being released from the sealing member 13.

Figure 3:
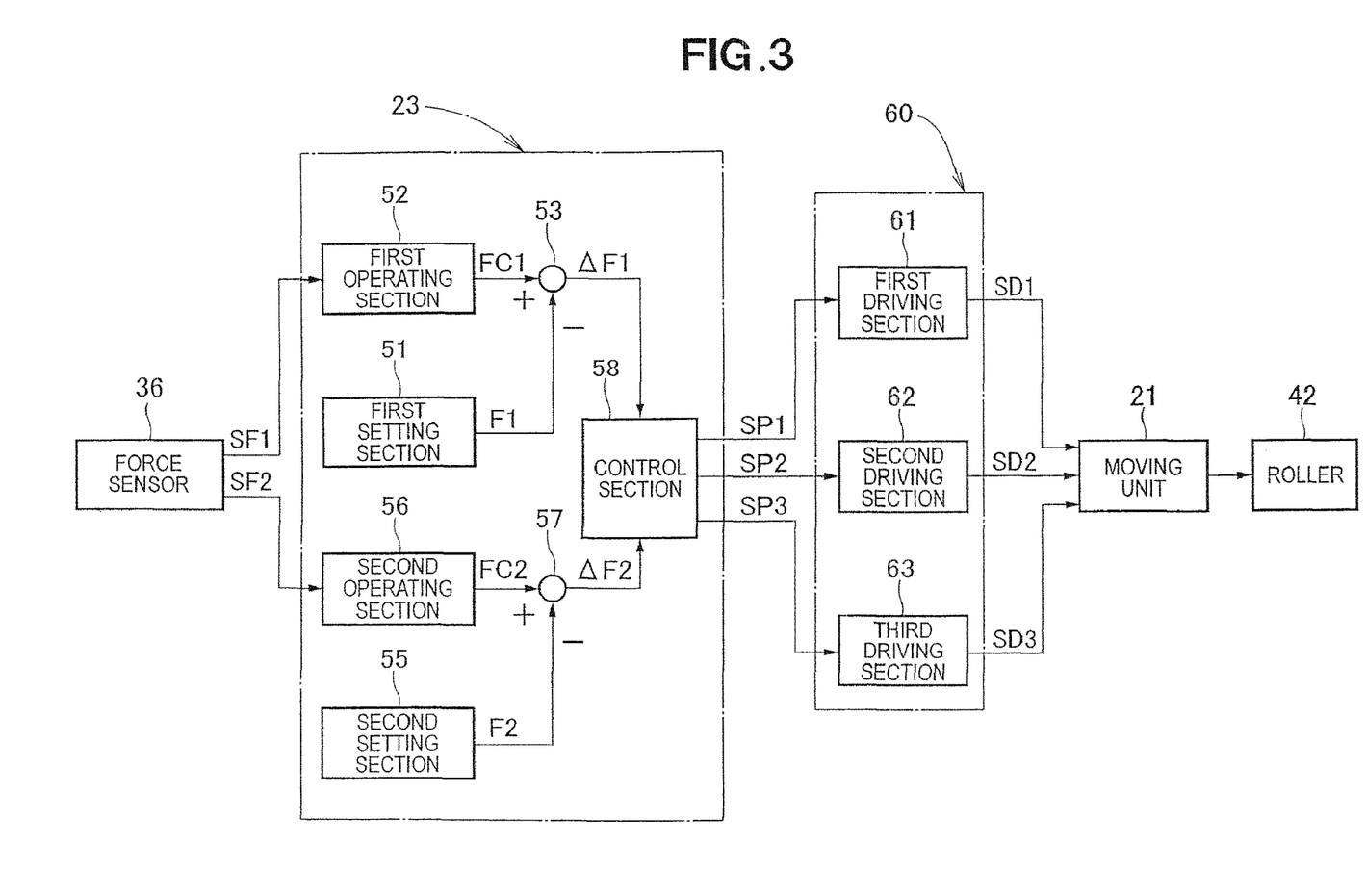
FIG. 3 is a block diagram showing electrical functions of a roller control unit and the surroundings of the roller control unit.

FIG. 3 is a block diagram showing electrical functions of the roller control unit 23 according to the present invention.

The roller control unit 23 includes a first setting section 51, a first operating section 52, a first subtracter 53, a second setting section 55, a second operating section 56, a second subtracter 57, and a control section 58.

The first setting section 51 sets a target value F1 of a first pressing force of the roller 42 (a pressing force directed in the direction along the Y-axis of FIG. 2). The first operating section 52 calculates a first reaction force FC1 applied to the roller 42 (a reaction force directed in the direction along the Y-axis of FIG. 2), on the basis of a force signal SF1 output from the force sensor 36. The first subtracter 53 calculates a difference $\Delta$ F1 (FC1−F1) on the basis of the target value F1 and the first reaction force FC1.

The second setting section 55 sets a target value F2 of a second pressing force of the roller 42 (a pressing force directed in the direction along the Z-axis of FIG. 2). The second operating section 56 calculates a second reaction force FC2 applied to the roller 42 (a reaction force directed in the direction along the Z-axis of FIG. 2), on the basis of a force signal SF2 output from the force sensor 36. The second subtracter 57 calculates a difference $\Delta$ F2 (FC2−F2) on the basis of the target value F2 and the second reaction force FC2.

The control section 58 controls operation of the moving unit 21 on the basis of the differences $\Delta$ F1, $\Delta$ F2.

Next, description will be made with reference to FIG. 4A through FIG. 4D as to how the pressing unit 22 installs the sealing member 13 on the flange 31.

Figure 4A:
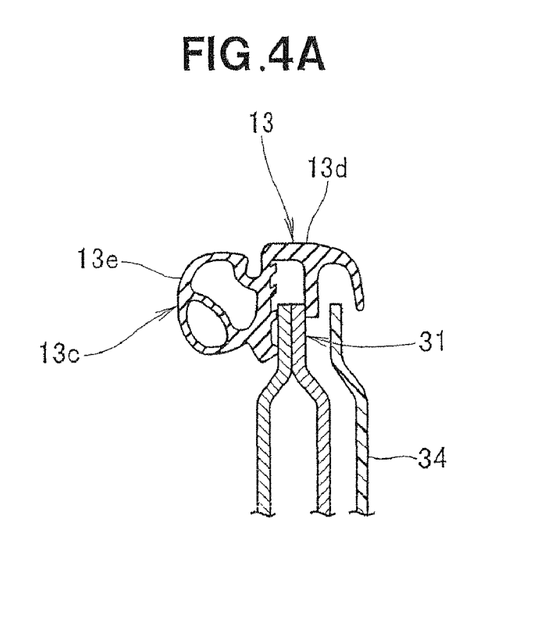
FIG. 4A to FIG. 4D are views showing a manner of installing the sealing member on the vehicle flange.

First, the sealing member 13 is temporarily installed on the flange 31, as shown in FIG. 4A.

Figure 4B:
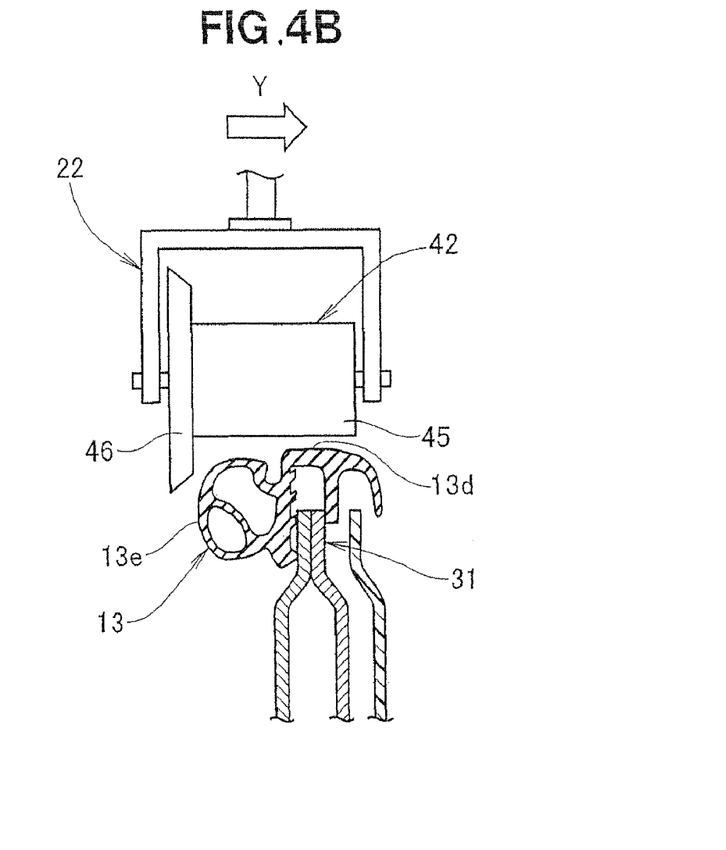

Then, the moving unit 21 is driven to move the roller 42 to a predetermined position proximate to the sealing member 13, as shown in FIG. 4B. The moving unit 21 moves the roller 42 in the direction along the Y-axis.

Figure 4C:
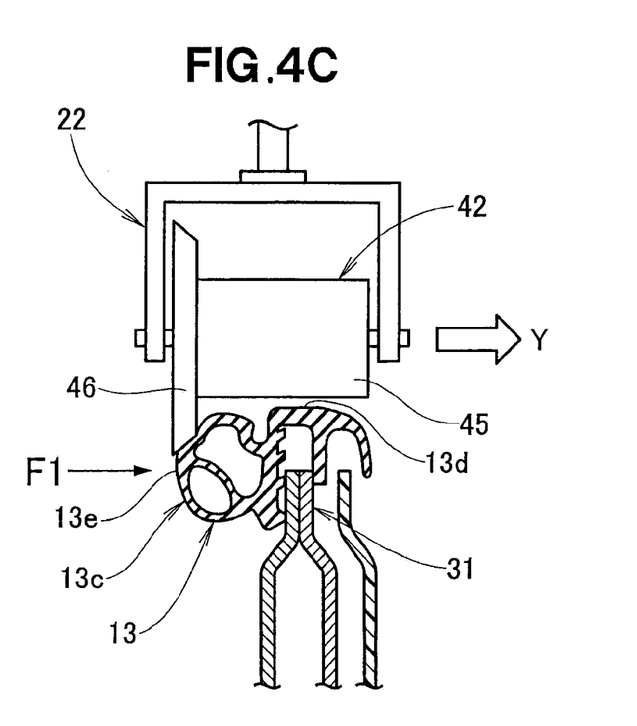

As shown in FIG. 4C, the moving unit 21 further moves the roller 42 in the direction along the Y-axis to press the roller flange 46 against the side face 13e of the projecting hollow portion 13c of the sealing member 13 with a constant pressing force F1 applied to the side face 13e.

Figure 4D:
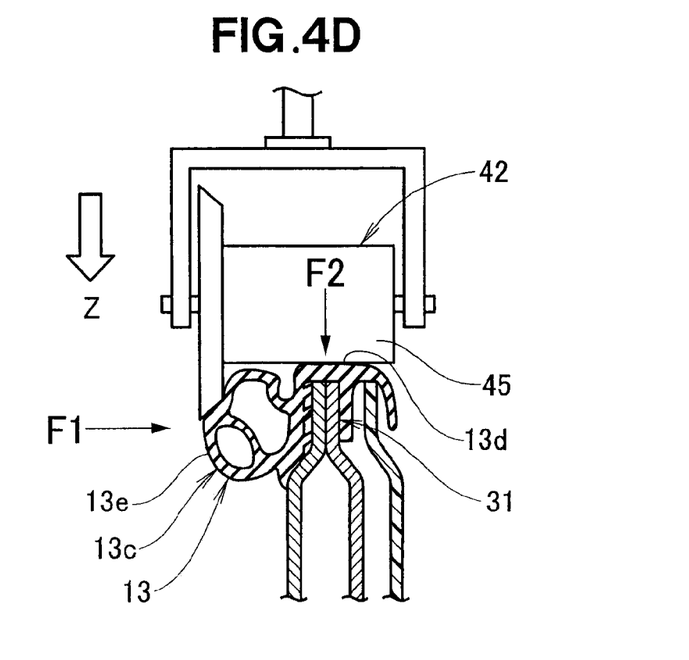

As shown in FIG. 4D, the roller 42 is moved in the direction along the Z-axis to press the roller body 45 of the roller 42 against the back face 13d of the sealing member 13 with a constant pressing force F2 applied to the back face 13d. At this time, the constant pressing force F1 remains applied to the side face 13e.

Figure 5:
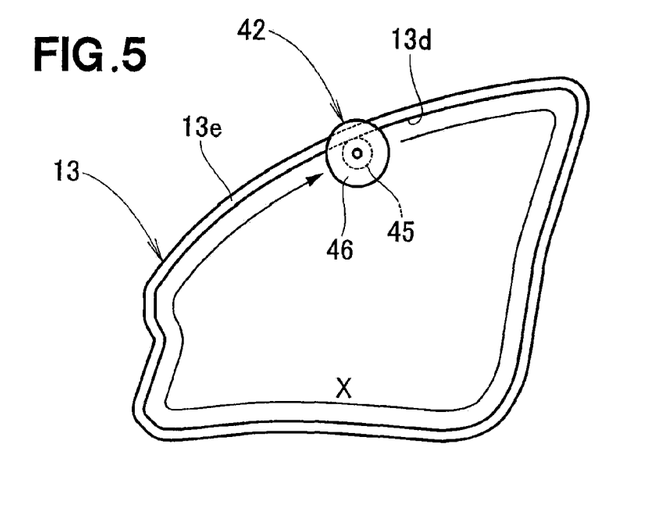
FIG. 5 is a view showing an operation for moving a roller of the apparatus along the vehicle flange to install the sealing member on the vehicle flange.

Finally, as shown in FIG. 5, the roller 42 is moved along the flange 31 of the door installation opening 11 as shown by an arrow X with the roller 42 pressed against the side face 13e and the back face 13d of the sealing member 13. During the movement of the roller 42 along the flange 31, the roller 42 is free to rotate. The movement and rotation of the roller 42 installs the sealing member 13 on the flange 31.

Figure 6:
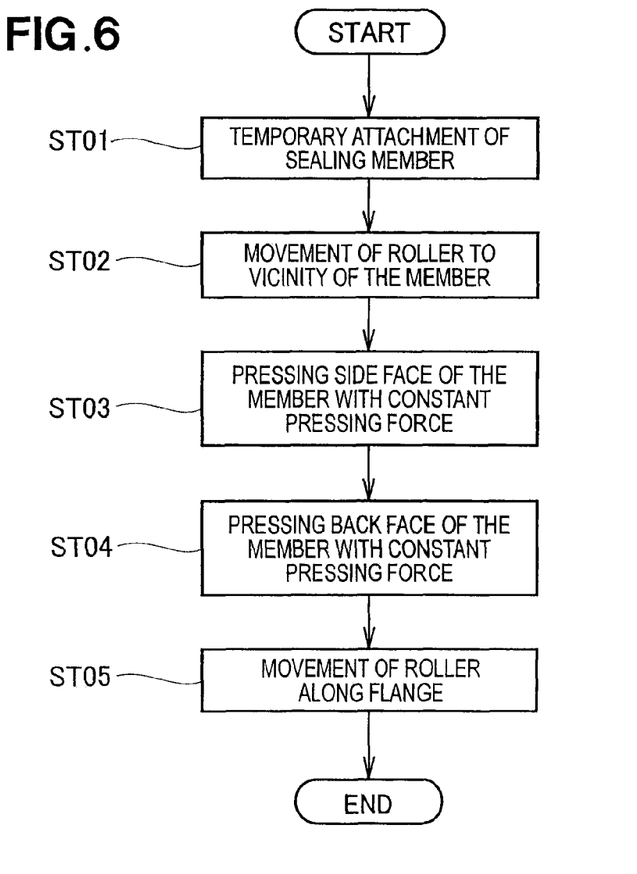
FIG. 6 is a flow chart showing a process for installing the sealing member on the vehicle flange.

The method for installing the sealing member 13 on the flange 31 as described in relation to FIG. 4A to FIG. 4D and FIG. 5 will be explained with reference to a flow chart shown in FIG. 6.

Step (hereinafter referred to as "ST") 01: temporarily attaching the sealing member 13 to the flange 31.

ST 02: moving the roller 42 to the predetermined position proximate to the sealing member 13.

ST 03: pressing the side face 13e of the projecting hollow portion 13c with the roller flange 46 exerting the constant pressing force F1 on the side face 13e.

ST 04: pressing the back face 13d of the sealing member 13 with the roller body 45 exerting the constant pressing force F2 exerted on the back face 13d.

ST 05: moving the roller 42 along the flange 31 of the door installation opening 11 while pressing the roller 42 against the side face 13e and the back face 13d of the sealing member 13.

A control to be conducted in installing the sealing member 13 on the flange 31 will be described with reference to FIG. 3.

The control section 58 generates first, second and third positional control signals SP1, SP2, SP3, on the basis of the differences Δ F1, Δ F2.

A robot-driving section 60 includes a first driving section 61 for moving the roller 42 in the direction along the Z-axis, a second driving section 62 for moving the roller 42 in the direction along the Y-axis, and a third driving section 63 for moving the roller 42 in the direction along the X-axis.

The first driving section 61 generates a first driving signal SD1 on the basis of the first positional control signal SP1 output from the control section 58. Based on this first driving signal SD1, the moving unit 21 drives the roller 42 such that the roller flange 46 of the roller 42 presses the side face 13e of the sealing member 13 with the constant pressing force F1 exerted on the side face 13e.

The second driving section 62 generates a second driving signal SD2 on the basis of the second positional control signal SP2 output from the control section 58. Based on this second driving signal SD2, the moving unit 21 drives the roller 42 such that the roller body 45 of the roller 42 presses the back face 13d of the sealing member 13 with the constant pressing force F2 exerted on the back face 13d.

The third driving section 63 generates a third driving signal SD3 on the basis of the third positional control signal SP3 output from the control section 58. Based on this third driving signal SD3, the moving unit 21 drives the roller 42 to move the roller 42 along the flange 31.

As discussed above, after the sealing member 13 is temporarily attached to the flange 31 provided in the door installation opening 11, the roller 42 moves along the flange 31 while pressing the sealing member 13 such that the roller flange 46 always exerts the constant first pressing force F1 on the side face 13e to press the side face 13e facing towards the vehicle-outside of the sealing member 13, and the roller body 45 always exerts the constant second pressing force F2 on the back face 13d of the sealing member 13 to press the back face 13d towards the flange 31.

More specifically, the force sensor 36 provided between the roller 42 and the moving unit 21 detects reaction force applied to the roller 42, and the moving unit 21 is controlled on the basis of the reaction forces such that the first pressing force F1 of the roller flange 46 to press the side face 13e and the second pressing force F2 of the roller body 45 to press the back face 13d towards the flange 31 are always kept constant while the roller 42 is pressed against the sealing member 13.

Thus, the exertion of the constant second pressing force F2 of the roller body 45 of the roller 42 enables the sealing member 13 to be fitted uniformly with the flange 31 such that the gap between the door installation opening 11 and the vehicle door is sufficiently sealed.

The exertion of the constant first pressing force F1 of the roller flange 46 of the roller 42 enables the roller 42 to move precisely along the sealing member 13 such that the sealing member 13 can be pressed by the roller 42 under an invariable condition.

The installing method and apparatus discussed above can install the sealing member 13 precisely uniformly in the door installation opening 11, accommodating the displacement of the vehicle body and the manufacturing errors of the flange 31.

INDUSTRIAL APPLICABILITY

The method and apparatus according to the present invention is suitable for installing the sealing member in the door installation opening and is applicable not only to an automobile industry but also to other various industries requiring use of industrial robots for installing sealing members in door installation openings so as to seal gaps between the openings and doors.

The invention claimed is:

1. A method for installing a sealing member on a vehicle flange with a roller pressing the sealing member against the vehicle flange, the vehicle flange being formed in a door installation opening of a vehicle, the method comprising the steps of:

temporarily attaching the sealing member to the vehicle flange;

pressing a tapered outer peripheral surface of a roller flange against a side face of the sealing member with a first pressing force exerted on the side face, the roller flange being formed at one end of a roller body of the roller, the tapered outer peripheral surface of the roller extending obliquely relative to a longitudinal axis of the roller body and the side face of the sealing member facing towards an outside of the vehicle; and pressing the roller body against a back face of the sealing member and towards the vehicle flange with a second pressing force exerted on the back face, wherein the roller moves along the vehicle flange while pressing the sealing member such that the first pressing force and the second pressing force are always constant.

2. An apparatus for installing a sealing member on a vehicle flange formed in a door installation opening of a vehicle, the apparatus comprising:

a roller including a roller body and a roller flange formed at one end of the roller body, the roller flange having a tapered outer peripheral surface for pressing a side face of the sealing member, the tapered outer peripheral surface of the roller extending obliquely relative to a longitudinal axis of the roller body and the side face facing towards an outside of the vehicle;

a moving unit for moving the roller along the vehicle flange while pressing the roller against the sealing member;

a force sensor disposed between the roller and the moving unit for detecting a reaction force applied to the roller; and a control unit for controlling the moving unit on the basis of the reaction force detected by the force sensor, such that a first pressing force of the roller flange to press the side face of the sealing member and a second pressing force of the roller body to press a back face of the sealing member towards the vehicle flange are always constant as the roller is pressed against the sealing member.

* * * * *